(12) United States Patent
Ladyzhenskii (10) Patent No.: US 7,433,906 B2
(45) Date of Patent: Oct. 7, 2008

(54) METHOD OF UPDATING A SHIFT REGISTER

(75) Inventor: Rudolf Ladyzhenskii, Oakleigh East (AU)

(73) Assignee: Indoaust Investments Ltd., Melbourne, Victoria (AU)

( * ) Notice: Subject to any disclaimer, the term of this patent is extended or adjusted under 35 U.S.C. 154(b) by 574 days.

(21) Appl. No.: 10/416,638

(22) PCT Filed: Oct. 31, 2001

(86) PCT No.: PCT/AU01/01405

§ 371 (c)(1),
(2), (4) Date: Oct. 14, 2003

(87) PCT Pub. No.: WO02/41512

PCT Pub. Date: May 23, 2002

(65) Prior Publication Data

US 2004/0052222 A1    Mar. 18, 2004

(30) Foreign Application Priority Data

| Nov. 15, 2000 | (AU) | ........... | PR1487 |
| Dec. 13, 2000 | (AU) | ........... | PR2063 |
| Jan. 11, 2001 | (AU) | ........... | PR2505 |

(51) Int. Cl.
*G06F 1/02*    (2006.01)
*H04B 7/216*    (2006.01)

(52) U.S. Cl. .................................................. 708/252

(58) Field of Classification Search ............... 708/250, 708/252, 492
See application file for complete search history.

(56) References Cited

U.S. PATENT DOCUMENTS

| 5,079,733 | A * | 1/1992 | Antoine et al. ............... 708/252 |
| 6,339,781 | B1 * | 1/2002 | Sasaki .......................... 708/252 |
| 2002/0013797 | A1 * | 1/2002 | Jha et al. ..................... 708/250 |
| 2002/0019840 | A1 * | 2/2002 | Asano .......................... 708/252 |

FOREIGN PATENT DOCUMENTS

| EP | 0 660 541 A2 | 6/1995 |
| JP | 11-205099 | 7/1999 |
| JP | 11-340799 | 12/1999 |
| WO | WO 97/06609 | 2/1997 |

OTHER PUBLICATIONS

TIA Interim Standard. "Mobile Station-Base Station Compatibility Standard for Dual-Mode Wideband Spread Spectrum Cellular System." May 1995.
Rappaport. "Wireless Communications Principles & Practice." 1996.

* cited by examiner

*Primary Examiner*—Chuong D Ngo
(74) *Attorney, Agent, or Firm*—Merchant & Gould P.C.

(57) ABSTRACT

There is disclosed a method of updating a pseudo noise code shift retiser in a noise code shift register in a software implemented CDMA system from a current value, including representing a tap polynomial as a tap polynomial binary sequence logically AND-ing the value of a last stage of the current value of the register with each of the bits of the tap polynomial sequence and logically XOR-ing the result of the logical AND operation with the current value of the register.

9 Claims, 5 Drawing Sheets

METHOD OF UPDATING A SHIFT REGISTER

FIELD OF THE INVENTION

The present invention relates generally to cellular telecommunications and more specifically to a technique for updating a shift register holding a pseudo-noise sequence. The technique may be used in connection with the generation of short codes and for long codes in a code division multiple access (CDMA) communication system.

BACKGROUND TO THE INVENTION

CDMA systems and protocols are specified in Interim-Standard ninety-five (IS-95) by the US Telecommunications Industry Association and CDMA2000 RC1.

The link between a mobile station and a base station is made up of two channels, the forward channel (from the base station to the mobile station) and the reverse channel (from the mobile station to the base station).

The forward channel is composed of four different types of code channels: a pilot channel, sync channel, paging channels and forward traffic channels.

A typical forward CDMA channel consists of 64 code channels. The 64 code channels consist of a pilot channel, one sync channel, seven paging channels and 55 forward traffic channels.

The pilot channel is an unmodulated, direct-sequence spread spectrum signal that is transmitted at all times by the base station on every active forward channel. The mobile station monitors the pilot channel to acquire the timing of the forward CDMA channel and to obtain a phase reference for coherent demodulation.

The sync channel is used to transport synchronisation messages to mobile stations within a CDMA cell. It is used by the mobile station to acquire initial time synchronisation.

The paging channel is used to transmit control information and pages to mobile stations residing in the CDMA cell.

The forward traffic channel is used for transmission of user and signalling traffic from the base station to a specific mobile station during a phone call.

All of the code channels in the forward CDMA channel are orthogonally spread by an appropriate Walsh function and then undergo quadrature spreading (the sync channel, paging channel and forward traffic channel also undergo several other processes before being orthogonally spread).

In particular, long codes which are pseudo-noise PN sequences, are used to scramble the paging and traffic channels. Each channel is uniquely assigned a long PN code which has a period of $2^{42}-1$ chips. The long code is specified by the characteristic polynomial $p(x)=x^{42}+x^{35}+x^{33}+x^{31}+x^{27}+x^{26}+x^{25}+x^{22}+x^{21}+x^{+19}+x^{18}+x^{17}+x^{16}+x^{10}+x^{7}+x^{6}+x^{5}+x^{3}+x^{2}+x^{1}+1$. Each PN chip of the long code is usually generated by inner product of a 42 bit mask (a code exclusive to the channel) and the 42 bit state vector of a linear sequence generator.

In the prior art, a PN sequence is usually generated by a linear PN sequence generator which consists of a 42 stage linear feedback shift register where the feedback logic is exclusive-OR (XOR) gates. Binary sequences are shifted through the shift registers in response to clock pulses, and the output of the various stages are logically combined and fed back as the input to the first stage. A 42-stage linear shift register generates a maximal length PN sequence of $2^{42}-1$ symbols.

Further details of PN sequence generation can be found by reference to IS-95 or by referring to text books such as *Wireless Communications Principles & Practice* by Theodore S. Rappaport (ISBN 0-13-375536-3).

It will be appreciated that in order to achieve the IS-95 PN sequence chip rate of 1.2288 million chips per second, the shift register must be updated approximately every 19.5 microseconds. A single chip of the PN sequence must be produced approximately every 52 microseconds.

The forward CDMA channels are all orthogonally spread using Walsh Functions at a fixed chip rate of 1.2288 Mcps. The purpose of orthogonal spreading is to provide orthogonal channelization among all code channels. The pilot channel is always spread with Walsh code 0, the SYNC channel is always spread with Walsh code 32 and the paging channels are assigned Walsh codes 1 through 7.

Following Walsh spreading, all code channels undergo Quadrature Spreading, which involves performing the modulo-2 addition of the orthogonally spread data with the short code pseudo noise (PN) sequence generated by the short code generator. The tap polynomials for the Short Code shift registers are:

$P_I(x)=x^{15}+x^{13}+x^{9}+x^{8}+x^{7}+x^{5}+1$ $P_Q(x)=x^{15}+x^{12}+x^{11}+x^{10}+x^{6}+x^{5}+x^{4}+x^{3}+1$

The output of the quadrature spreader is in the form of In-Phase (I) and Quadrature (Q) channels. The I and Q data streams (channels) are then each passed through a Baseband Filter which shapes the waveform to meet required bandwidth constraints as well as minimize Inter Symbol Interference (ISI).

The I and Q channels are then modulated using Quadrature Phase Shift keying (QPSK). This is done in the I channel by amplitude modulating the cosine function with an amplitude of binary 0's and 1's to produce a BPSK (Binary Phase Shift Keying) waveform. In the Q channel, the sine function is modulated producing an orthogonal BPSK waveform. The summation of the BPSK waveforms then yields the QPSK waveform.

To the applicant's knowledge all existing CDMA systems are implemented as hardware. Recently, it has been proposed that existing cellular telecommunications hardware could be replaced by a software implemented radio telecommunication system. It will be appreciated that software-implementations will benefit from an efficient technique for updating the registers holding the long and short codes.

SUMMARY OF THE INVENTION

Accordingly, the invention provides a method of updating a pseudo noise code shift register from a current value to a new value, including:

a) representing a tap polynomial as a tap polynomial binary sequence;

b) logically AND-ing the value of a last stage of the current value of the register with each of the bits of the tap polynomial sequence; and c) logically XOR-ing the r sult of step b) with the current value of the register.

Preferably, step (b) is performed by extending said value of a last stage of said register to at least a sequence length of said tap polynomial binary sequence and logically AND-ing said sign extended value with said tap polynomial binary sequence.

In one embodiment, the method involves the steps of shifting the current value of the register one bit towards the most significant bit and assigning the value of the last stage of the current value of the register to the first stage of the new value of the register after step (c).

In another embodiment, the invention representing the tap polynomial involves producing a binary sequence which is shifted by one bit towards the most significant bit, with the least significant bit set to 1, and the method involves shifting the current value of the register by one bit towards the most significant bit before performing step (b).

BRIEF DESCRIPTION OF THE DRAWINGS

An example of a preferred embodiment of the invention will now be described in relation to the accompanying drawings in which.

DESCRIPTION OF THE PREFERRED EMBODIMENT

In a CDMA system the link between a mobile station and a base station is made up of two channels, the forward channel (from the base station to the mobile station) and the reverse channel (from the mobile station to the base station).

The preferred embodiment relates to the transmit section of the forward channel. A description of a forward CDMA channel will now be given.

Figure 1A:
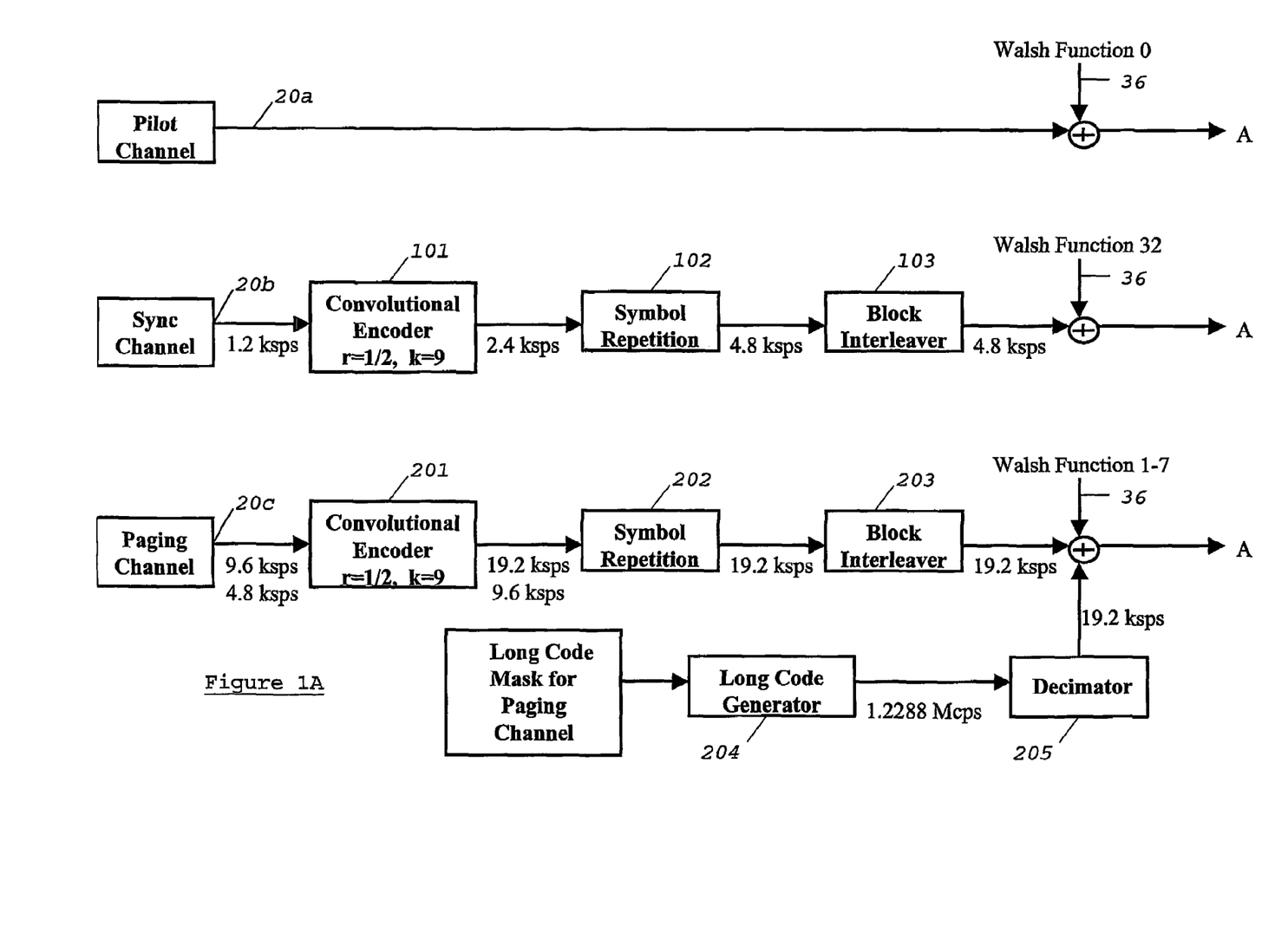
FIGS. 1A, 1B and 1C, illustrate the forward CDMA channel structure.
Figure 1B:
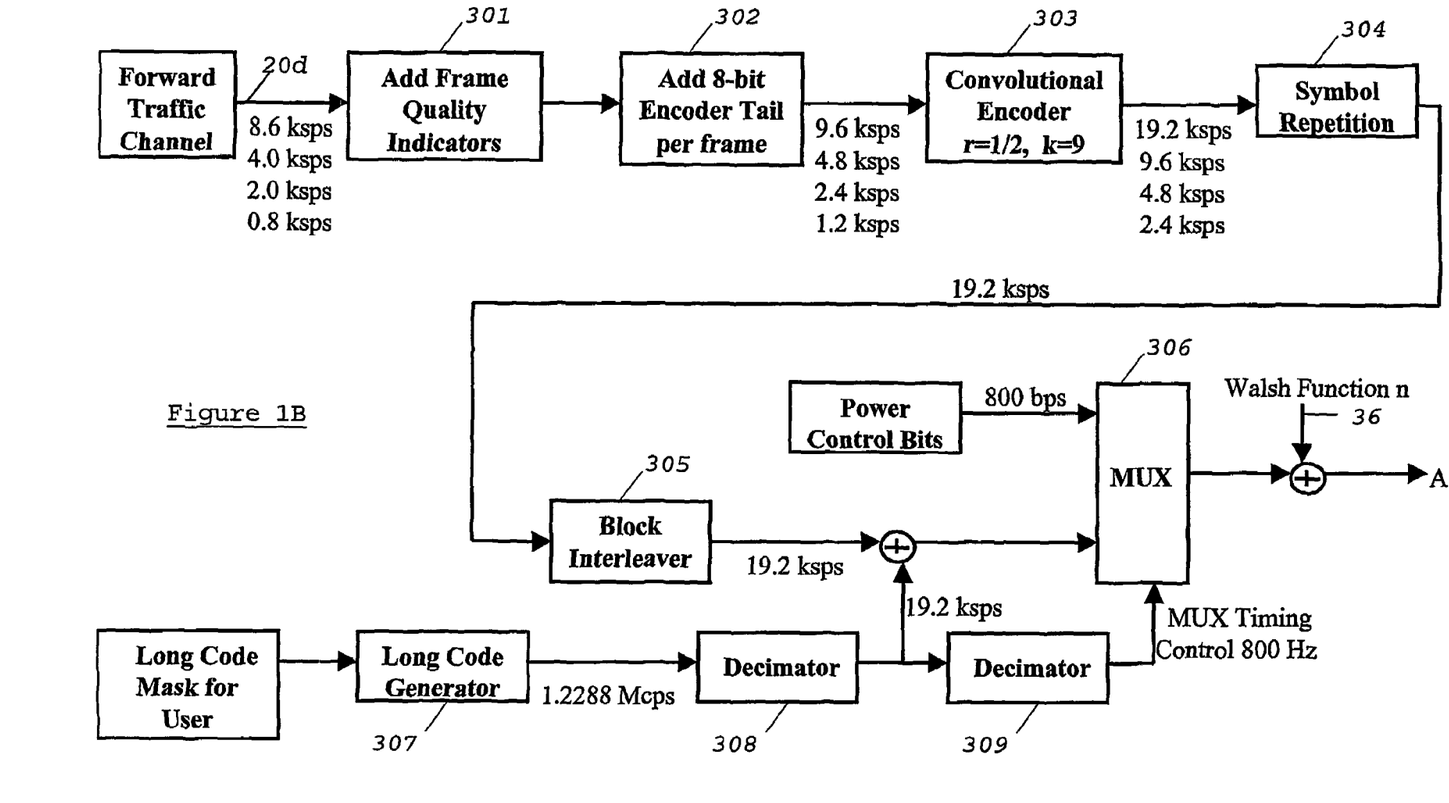
Figure 1C:
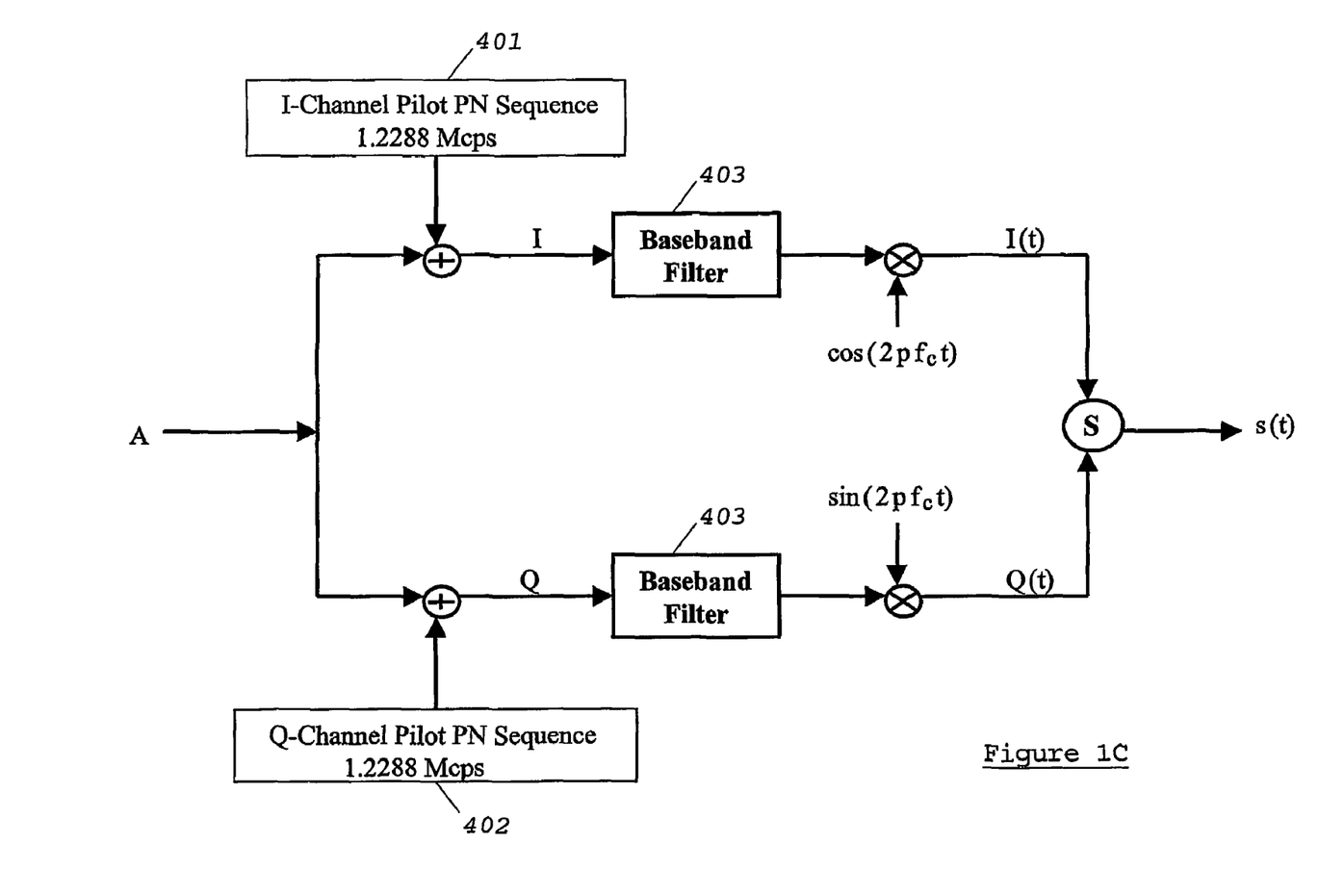

FIGS. 1A, 1B and 1C illustrate the forward CDMA channel structure of the prior art. The preferred embodiment relates to a modification of this forward channel structure as it specifically relates to a method which allows quadrature spreading to be efficiently performed in software.

As FIGS. 1A-1C show, the forward channel is composed of four different types of code channels: a pilot channel $20a$, sync channel $20b$, paging channels $20c$ and forward traffic channels $20d$.

A typical forward CDMA channel consists of 64 code channels that are available for use. The 64 code channels are comprised of a pilot channel, a sync channel, seven paging channels and fifty-five forward traffic channels.

The pilot channel $20a$ is an unmodulated, direct-sequence spread spectrum signal that is transmitted at all times by the base station on every active forward channel. The mobile station monitors the pilot channel to acquire the timing of the forward CDMA channel and provides a phase reference for coherent demodulation.

The sync channel $20b$ is used to transport synchronization messages to mobile stations within the CDMA cell. It is used by the mobile station to acquire initial time synchronization.

The paging channels $20c$ are used to transmit control information and pages to mobile stations residing in the CDMA cell.

The forward traffic channels $20d$ are used for transmission of user and signaling traffic from the base station to a specific mobile station during a phone call.

Referring to FIGS. 1A and 1B, all of the code channels $20a$-$20d$ in the forward CDMA channel are orthogonally spread by the appropriate Walsh function 36 before they undergo quadrature spreading. However, as known to persons skilled in the art, the sync channel, paging channel and forward traffic channel undergo several other processes which will now be described.

The sync, paging and traffic channels all undergo convolutional encoding using a convolutional encoder 101, 201, 303. This process protects the system from errors that can occur at the high data rates used in CDMA. In convolutional encoding, the channel data streams are divided into smaller blocks of length k and are then encoded into code word symbols of length n. The (n, k, m) convolutional code is implemented where k is the input, n is the output and m is memory order. The rate of the encoder is then defined by the code rate R=k/n. The sync, paging and traffic channels all use an encoder with a code rate R=1/2.

Symbol repetition 102, 202, 304 is also used by all channels except th pilot channel. The function of this process is to increase the data rate to the level used by the Block Interleaver 103, 203, 305, which is 19200 sps (symbols per second) or 19.2 ksps. For example, the data rate on the sync channel aft r convolutional encoding is 2.4 ksps. This value is increased 8 times to 19.2 Ksps by repeating each convolutionally encoded symbol 7 times. A 9.6 ksps stream however (such as the one in the paging channel), would only need to be repeated once to produce a 10.2 ksps stream.

Block interleaving 103, 203 and 305 is performed in order to reorder a sequence of symbols and is performed to achieve time diversity and improve performance.

Long code generation is performed in the paging and traffic channels by long code generator 204, 307. The Long Code Generator produces long codes, which are 42 bit pseudonoise PN sequences that are used for scrambling on the forward CDMA channel which produces limited privacy.

The Long Code Generator produces $2^{42}-1$ combinations of different long code and each long code uniquely identifies a mobile station on both the forward traffic channel and reverse traffic channel. The long code is characterized by the long code mask that is used to form either the public long code or the private long code. The long code is specified by the characteristic polynomial $p(x)=x^{42}+x^{35}+x^{33}+x^{31}+x^{27}+x^{26}+x^{25}+x^{22}+x^{21}+x^{19}+x^{18}+x^{17}+x^{16}+x^{10}+x^{7}+x^{6}+x^{5}+x^{3}+x^{2}+x^{1}+1$.

The output of the Long Code Generator is fed through a Decimator 205, 309. The Decimator reduces the size of the long code by taking 1 out of every 64 bits. This has the result of reducing the data rate from 1228800 cps (chips per second) or 1.2288 Mcps to 19.2 ksps.

As mentioned above, after the above-described processes have been performed on the relevant channels, all the code channels on the forward CDMA channel are orthogonally spread using Walsh Functions at a fixed chip rate of 1.2288 Mcps. This provides orthogonal channelization among all code channels. The pilot channel is always spread with Walsh code 0, the SYNC channel is always spread with Walsh channel 32 and the paging channels are assigned code channels 1 through 7.

As shown in FIG. 1C, following Walsh spreading, all code channels undergo quadrature spreading, which involves performing the modulo-2 addition of the orthogonally spread data of each code channel with a PN short code sequence generated by the short code generator. The tap polynomials for the Short Code shift registers are:

$$P_I(x)=x^{15}+x^{13}+x^9+x^8+x^7+x^5+1$$

$$P_Q(x)=x^{15}+x^{12}+x^{11}+x^{10}+x^6+x^5+x^4+x^3+1$$

The output of the quadrature spreader is in the form of In-Phase (I) and Quadrature (Q) channels 401, 402. It is possible that alternative techniques may be used for quadrature spreading. However, irrespective of the technique used, the spread data will be combined with the short code.

The I and Q data streams (channels) are then each passed through a Baseband Filter 403 which shapes the waveform to meet required bandwidth constraints as well as minimize y(ISI).

After the required filtering, the I and Q channels are modulated using Quadrature Phase Shift keying (QPSK). This is done in the I channel by amplitude modulating the cosine function with an amplitude of binary 0's and 1's to produce a BPSK (Binary Phase Shift Keying) waveform. In the Q channel, the sine function is modulated producing an orthogonal BPSK waveform. The summation of the BPSK waveforms then yields the QPSK waveform which is transmitted on the forward channel.

It will be apparent that each of the long and short codes must be maintained in a shift register which needs to be updated after each chip of code is generated.

The techniques of the preferred embodiment will now be described generically in relation to FIGS. 2 and 3. Following the generic description, there are specific examples of how the techniques can be applied to updating shift registers for both long and short codes.

Figure 2:
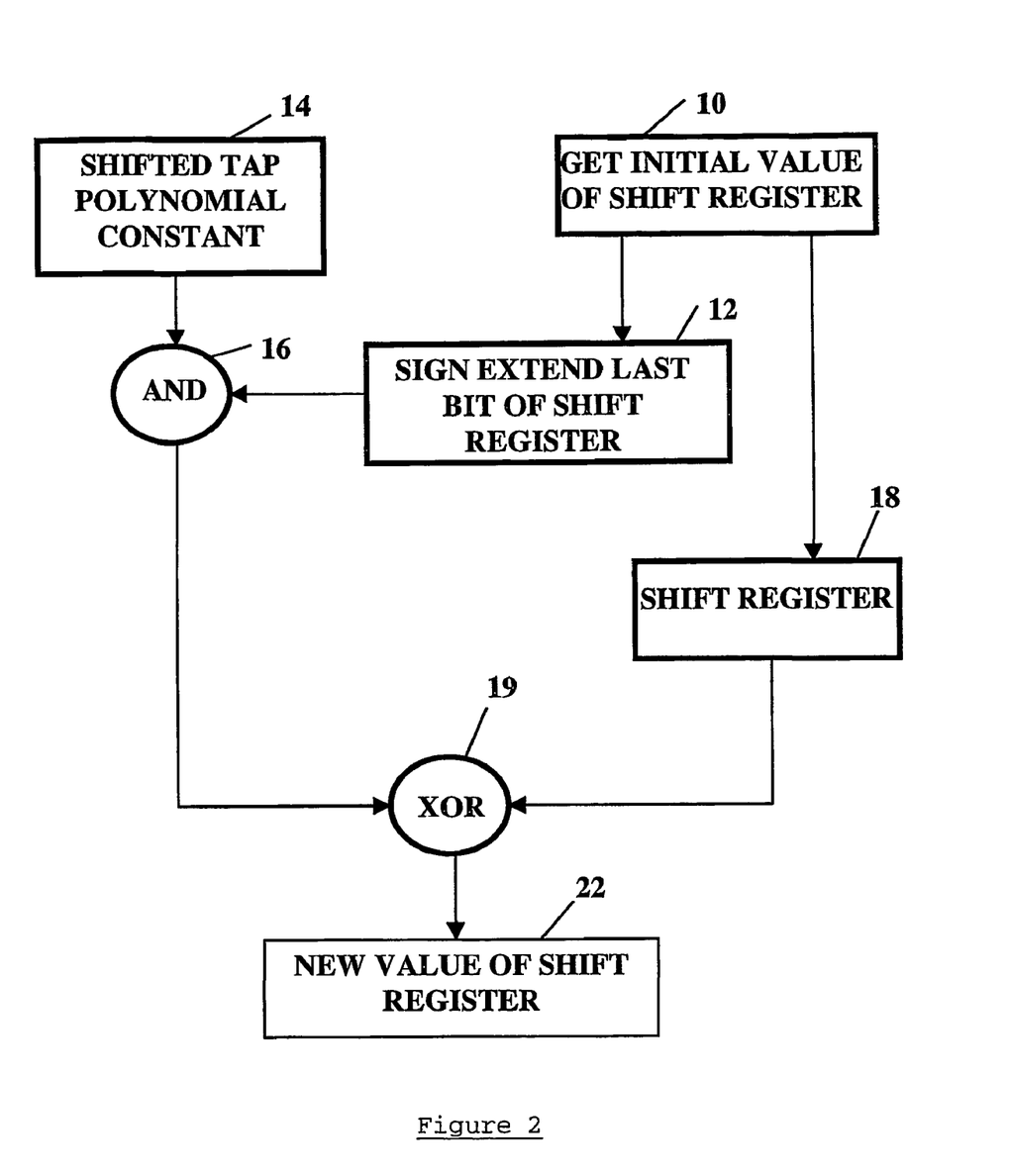
FIG. 2 is a flow chart showing the method of a first embodiment of the invention.
Figure 3:
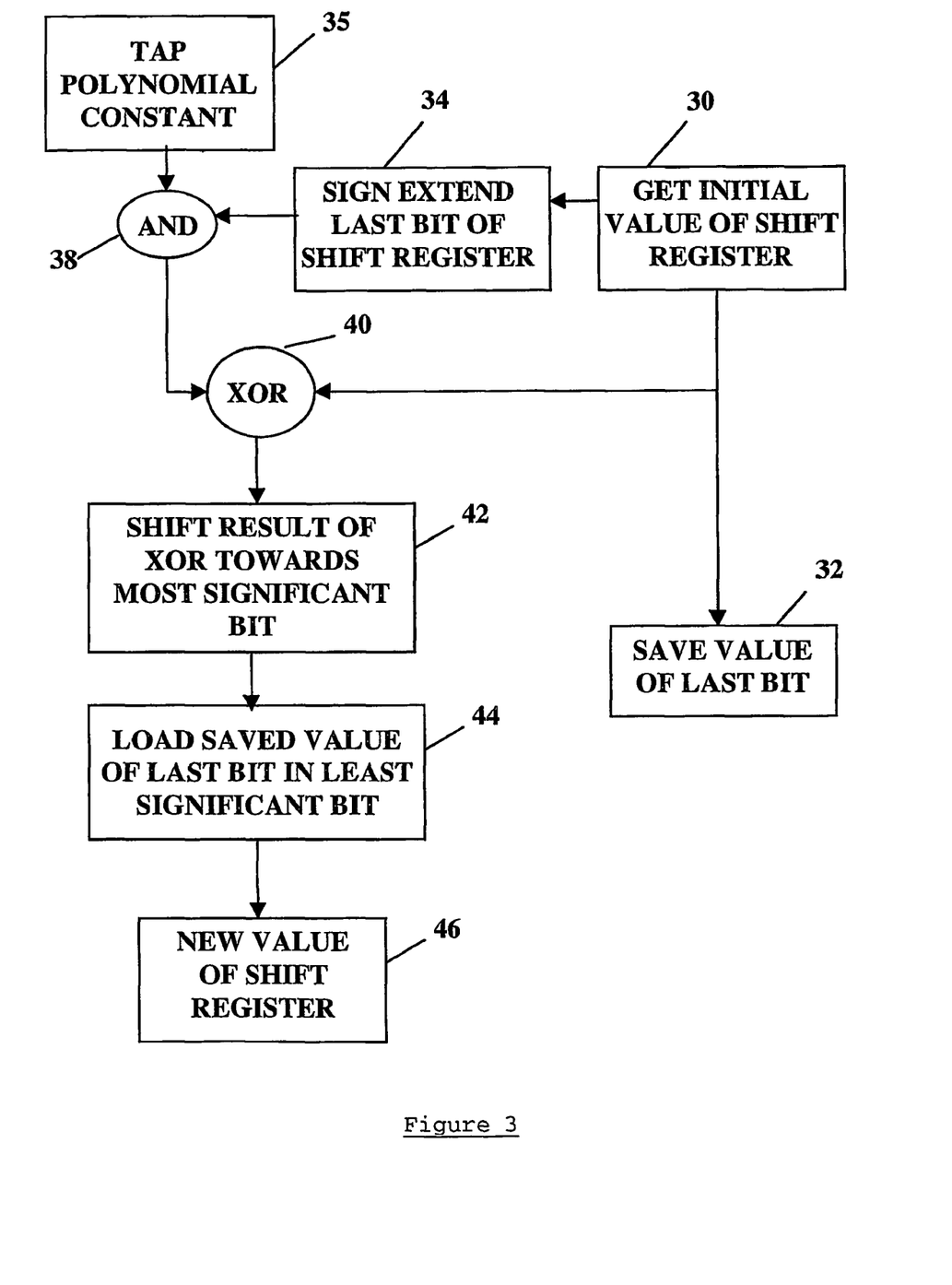
FIG. 3 is a flow chart showing the method of a second embodiment of the invention.

FIG. 2 shows the technique of the preferred embodiment.

It will be appreciated that the tap polynomial for either the long or short code can be represented as a binary sequence. This needs to be combined with the current value of the shift register in order to obtain the new value of the shift register.

In the first preferred embodiment, the tap polynomial binary sequence is shifted one bit towards the most significant bit and the least significant bit is set to have the value 1. This produces a shifted tap polynomial constant which is stored in a data entity as indicated by step 14. The method then involves getting initial or current value of the shift register at step 10 and extending the last bit of the shift register to have sufficient bits in order for it to be combined with the shifted tap polynomial constant. At step 16 an AND operation is performed on the shifted tap polynomial constant using the sign extended last bit of the shift register. At step 18 the current value of the shift register is shifted by one bit towards the most significant bit. This shifted register is then combined at step 19 with the result of the AND operation performed at step 16 by performing an XOR operation. The result of the XOR operation then implicitly provides the new value of the shift register which can then be used to generate a further bit of long or short code.

FIG. 2 shows a slightly less efficient technique of a second less preferred embodiment. In this embodiment an unshifted tap polynomial constant is used as indicated at step 35. At step 30 the initial value of the shift register is obtained and the last bit of the shift register is sign extended. At the same time, the value of the last bit is saved at step 32. The sign extended last bit of the shift register is combined with the tap polynomial constant at step 38 using an AND operation and the result of this AND operation is combined with the initial value of the shift register using XOR operation at step 40. Following the XOR operation the result of the XOR operation is shifted towards the most significant bit and the saved value of the last bit from step 32 is loaded into the least significant bit at step 44 to produce the new value of the register at step 46.

EXAMPLE 1

Long Code

Following, the calculation of a chip of long code it is necessary to quickly update the shift register so that the next chip can be generated.

The Binary sequence that represents the long code tap polynomial $p(x)=x^{42}+x^{35}+x^{33}+x^{31}+x^{27}+x^{26}+x^{25}+x^{22}+x^{21}+x^{19}+x^{18}+x^{17}+x^{16}+x^{10}+x^{7}+x^{6}+x^{5}+x^{3}+x^{2}+x^{1}+1$ is given by

1000000101010001110011011110000010011101111 with the MSB is on the left and the LSB is on the right.

Shifting the register prior to applying the tap polynomial provides the most efficient technique for updating the shift register holding the long code. Bit O of the shifted version of tap polynomial is assigned the value 1. The shifted tap polynomial has the following form:

00000010101000111001101111000001001110111

The value of the last stage of the shift-register is saved and sign extended to have the same number of bits as the long code tap polynomial as indicated by step 12 of FIG. 2. Then an AND operation is performed with the shifted tap polynomial. The first stage of the register will be loaded with the desired value automatically without any explicit operation.

Assume that 42-bit data is representing the current state of the long code sequence stored in two 32-bit data entities, and is for example:

| Bit 31 | | | | | | | Bit 0 |
|---|---|---|---|---|---|---|---|
| 0110 | 1110 | 1010 | 0000 | 0100 | 0111 | 0110 | 0101 |
| Bit 63 | | | | | | | Bit 32 |
| 0000 | 0000 | 0000 | 0000 | 0000 | 0011 | 0001 | 1101 |

Note that bits 42-63 are allocated the value 0.

The fast shift register update is then carried out as follows:

The shifted version of the tap polynomial is stored in two 32-bit entities as:

| Bit 31 | | | | | | | Bit 0 |
|---|---|---|---|---|---|---|---|
| 1000 | 1110 | 0110 | 1111 | 0000 | 0100 | 1110 | 1111 |
| Bit 63 | | | | | | | Bit 32 |
| 0000 | 0000 | 0000 | 0000 | 0000 | 0000 | 0000 | 1010 |

This represents the actual polynomial for CDMA systems shifted by one bit with Bit 0 set to 1.

Last stage of the shift register (Bit 41) is 1. Sign extending it to 32-bits gives:

1111 1111 1111 1111 1111 1111 1111 1111

This is saved. If a 64-bit data entity were used, the last stage would need to be sign extended to 64-bits. That is, in the 32-bit case the data entity holding the extended last stage can be used to perform the AND operation on both the entities in which the polynomial is stored.

Now we shift the shift register left by one bit.

Result is:

| Bit 31 | | | | | | | Bit 0 |
|---|---|---|---|---|---|---|---|
| 1101 | 1101 | 0100 | 0000 | 1000 | 1110 | 1100 | 1010 |
| Bit 63 | | | | | | | Bit 32 |
| 0000 | 0000 | 0000 | 0000 | 0000 | 0010 | 0011 | 1000 |

Note that as we are representing a 42-bit register, bits 42 to 63 are always assigned the value "0".

Logically AND-ing both 32-bit entities of polynomial with the saved value of the sign-extended last stage gives the polynomial result:

| Bit 31 | | | | | | | Bit 0 |
|---|---|---|---|---|---|---|---|
| 1000 | 1110 | 0110 | 1111 | 0000 | 0100 | 1110 | 1111 |
| Bit 63 | | | | | | | Bit 32 |
| 0000 | 0000 | 0000 | 0000 | 0000 | 0000 | 0000 | 1010 |

Logically XOR-ing those values with the shifted shift register produces the result:

1101 1101 0100 0000 1000 1110 1100 1010 XOR (Shift Register value bits 0-31)

1000 1110 0110 1111 0000 0100 1110 1111 (Polynomial result bits 0-31)

Results:

| Bit 31 | | | | | | | Bit 0 |
|---|---|---|---|---|---|---|---|
| 0101 | 0011 | 0010 | 1111 | 1000 | 1010 | 0010 | 0101 |
| (New value of shift register, bits 0-31) | | | | | | | |
| 0000 | 0000 | 0000 | 0000 | 0000 | 0010 | 0011 | 1000 |
| XOR (Shift Register value bits 32-63) | | | | | | | |
| 0000 | 0000 | 0000 | 0000 | 0000 | 0000 | 0000 | 1010 |
| (Polynomial bits 32-63) | | | | | | | |

Equal to:

| Bit 63 | | | | | | | Bit 32 |
|---|---|---|---|---|---|---|---|
| 0000 | 0000 | 0000 | 0000 | 0000 | 0010 | 0011 | 0010 |
| (New value of shift register, bits 32-63) | | | | | | | |

New value of shift register is:

| Bit 31 | | | | | | | Bit 0 |
|---|---|---|---|---|---|---|---|
| 0101 | 0011 | 0010 | 1111 | 1000 | 1010 | 0010 | 0101 |
| Bit 63 | | | | | | | Bit 32 |
| 0000 | 0000 | 0000 | 0000 | 0000 | 0010 | 0011 | 0010 |

In the second preferred embodiment all stages of the shift register that correspond to a polynomial tap are XOR-ed with the value of the last stage, the shift register is then shifted and the value of the last stage is fed into the first stage of the shift register. The desired effect is obtained by converting the tap polynomial into a 42-bit binary sequence, then AND-ing every bit of it with the output from last stage of the shift register, and finally XOR-ing the result with current state of the shift register. Once this operation is complete, the contents of the entire shift register are shifted once and the saved value of the last stage is moved into the first stage.

EXAMPLE 2

Short Code

The shifting of the short code register occurs 1536 times for every power control group (PCG), with both the I and Q shift registers requiring this operation. The tap polynomials for the Short Code shift registers are:

$P_I(x) = x^{15} + x^{13} + x^9 + x^8 + x^7 + x^5 + 1$ $P_Q(x) = x^{15} + x^{12} + x^{11} + x^{10} + x^6 + x^5 + x^4 + x^3 + 1$

The shift registers for the I and the Q branches are represented by 16-bit data entities. Thus, both shift registers will occupy only 32 bits of memory.

The register is shifted prior to applying the tap polynomial. The tap polynomial is also shifted with the first bit set to 1. The shifted tap polynomials have the following forms:

0010 0011 1010 0001 (I-sequence, listed from left to right in the order MSB to LSB)

0001 1100 0111 1001 (Q-sequence, listed from left to right in the order MSB to LSB)

It will be noted that bit 15 has been set to zero.

The shifted tap polynomials are then logically AND-ed with the extended value of the last stage of the shift register before the result is logically XOR-ed with the shifted shift register.

In the alternative, the tap polynomial is converted into a 15-bit binary sequence. This sequence is logically AND-ed with the output from the last stage of the register and XOR the result with current value of shift register. After that shift register is shifted one bit towards the most significant bit and the value of the last stage is fed into the first stage.

In this case the unshifted binary sequences that represent the tap polynomials are:

0101 0001 1101 0000 (I-sequence, listed from left to right in the order MSB to LSB)

0100 1110 0011 1100 (Q-sequence, listed from left to right in the order MSB to LSB)

It will be noted that bit 15 has been set to zero.

Instead of AND-ing every bit of the tap polynomial sequence with the value of the last stage of the register (which requires 15 shifts and 15 AND operations), the value of the last shift register stage is first extended to the full 15 bits (actually to 16 bits in a C language implementation, where the shift register is physically represented by a 16 bit data entity). We then make use of signed arithmetic and shift this value left to the MSB position and shift it back to the LSB position to sign extend the value to the full 16 bits.

The value of the last stage is saved and sign-extended to 16-bits. The AND and XOR operation can now be accomplished easily and the register is shifted one bit towards the most significant bit. Finally the previous value of the last stage of shift register is assigned to the first stage.

It will also be apparent that skilled programmers can generate an appropriate computer program for implementing the method of the invention. The invention includes within its scope such a program and a processor, such as a DSP, so programmed.

Various modifications to the foregoing system will be apparent to persons skilled in the art and should be considered as falling within the scope of the present invention.

The claims defining the invention are as follows:

1. A method of updating a pseudo noise code shift register of a software-implemented radio telecommunication system from a current value to a new value, including:
 a) representing a tap polynomial as a tap polynomial binary sequence;
 b) logically AND-ing the value of a last stage of the current value of the register with each of the bits of the tap polynomial sequence;
 c) logically XOR-ing the result of step b) with the current value of the register; and
 d) updating the pseudo noise code shift register according to step c), wherein representing the tap polynomial involves producing a binary sequence which is shifted by one bit towards the most significant bit, with the least significant bit set to 1, and the method involves shifting the current value of the register by one bit towards the most significant bit before performing step (b).

2. A method as claimed in claim 1, wherein step (b) is performed by extending said value of a last stage of said register to at least a sequence length of said tap polynomial binary sequence and logically AND-ing said sign extended value with said tap polynomial binary sequence.

3. A method as claimed in claim 1, wherein the method involves the steps of shifting the current value of the register one bit towards the most significant bit and assigning the value of the last stage of the current value of the register to the first stage of the new value of the register after step (c).

4. A method as claimed in claim 1, wherein the sequence length is 42-bits.

5. A method as claimed in claim 1, wherein the sequence length is 15-bits.

6. A method as claimed in claim 1, wherein a computer processor is used to carry out step (a), step (b), step (c) and step (d).

7. A method as claimed in claim 6, wherein said processor is a digital signal processor.

8. A computer program for updating a pseudo noise code shift register of a software-implemented radio telecommunication system from a current value to a new value, the computer program recorded on a computer-readable medium and comprising:
 a) code for representing a tap polynomial as a tap polynomial binary sequence;
 b) code for logically AND-ing the value of a last stage of the current value of the register with each of the bits of the tap polynomial sequence to form an intermediate value;
 c) code for logically XOR-ing the intermediate value with the current value of the register; and
 d) updating the pseudo code shift register according to step c) wherein representing the tap polynomial involves producing a binary sequence which is shifted by one bit towards the most significant bit, with the least significant bit set to 1, whereby the current value of the register is shifted by one bit towards the most significant bit before logically AND-ing the value of the last stage of said register with each of the bits of said tap polynomial sequence to form said intermediate value.

9. The computer program of claim 8, wherein said value of a last stage of said register is extended to at least a sequence length of said tap polynomial binary sequence.

* * * * *